United States Patent Office 3,614,836
Patented Oct. 26, 1971

3,614,836
BLOCK COPOLYMER FOXING AND SOLING COMPOSITION
John L. Snyder, Long Beach, Thomas L. Keelen, Palos Verdes Peninsula, and Geoffrey Holden, Los Alamitos, Calif., assignors to Shell Oil Company, New York, N.Y.
Filed July 8, 1968, Ser. No. 743,035
Int. Cl. C08d 9/08
U.S. Cl. 36—2.5                    4 Claims

ABSTRACT OF THE DISCLOSURE

Improved compositions are provided especially for use as injection molded textile shoe foxing and soling comprising block copolymers having the structure polystyrene-polyisoprene-polystyrene with narrow molecular weight range specifications which provide improved adhesion of the foxing to canvas, injection moldability and ozone resistance. Compositions are also provided comprising combinations of the above-described block copolymers with block copolymers of the structure polystyrene-polybutadiene-polystyrene.

BACKGROUND OF THE INVENTION

During recent years, a wide variety of block copolymers has been studied for many industrial purposes. The choice of structure is especially broad since not only may the individual monomers and number of polymer blocks be varied but also the block molecular weight may be altered and the proportion of particular blocks to total polymer may also be adjusted to alter the properties of the block copolymers.

It has been found that within relatively narrow molecular weight ranges certain of these block copolymers may be referred to as thermoplastic elastomers. By this is meant polymers which exhibit the properties of elastomers without having been subjected to vulcanization but which at the same time exhibit the capability of being processed in thermoplastic processing equipment at temperatures usually above their softening point. One of the unique features of such block copolymers is their ability to be reprocessed, particularly insofar as scrap from any of the processing operations is concerned. Unless prepared within narrow molecular weight tolerances, this preferred class of block copolymers is relatively difficult to process by such operations as extrusion or injection molding and the like unless they are highly modified with materials such as extending oils or polymers such as polystyrene. Furthermore, due to their relatively complicated manufacture, the cost of such polymers is high enough that it would be highly desirable to utilize relatively lower cost extenders such as the oils and polystyrene or other polymers referred to above.

One of the basic disadvantages of one of the most thoroughly investigated types of block copolymers, namely, that having the structure polystyrene-polybutadiene-polystyrene, is their relative sensitivity to ozone, ultra-violet light and heat.

OBJECT OF THE INVENTION

It is an object of the present invention to provide improved block copolymers. It is a particular object of the invention to provide an improved block copolymer especially suitable for use as foxing on footwear. It is a special object of the invention to provide compositions exhibiting improved resistance to ozone cracking, improved resistance to yellowing on exposure to ultra-violet light and greater stability to change in viscosity during processing at elevated temperatures. Other objects will become apparent during the following detailed description of the invention.

STATEMENT OF THE INVENTION

Now, in accordance with the present invention, improved block copolymers are provided which are especially useful in foxing compositions for textile shoe uppers comprising those having the general structure polystyrene-polyisoprene-(polyisoprene-polystyrene)$_{1-5}$ wherein the total polystyrene block content is 45–55% by weight of the block polymer and each polystyrene block having an average molecular weight between about 30,000 and about 50,000. Preferably the polyisoprene blocks have an average molecular weight between about 70,000 and 90,000. Still in accordance with the present invention, it has been found that these particular block copolymers not only exhibit superior processability and adherence to textiles but also unexpectedly exhibit especially superior resistance to degradation by ozone and the like. Another superiority of these particular polymers is that less orientation results from flow during fabrication. Thus, strength and modulus in directions with and perpendicular to flow and hardness are less affected by changes in fabrication conditions. Furthermore, it has been found that during processing at elevated temperatures of other block copolymers, particularly those having the structure polystyrene-polybutadiene-polystyrene, the viscosity can be stabilized by admixture with polystyrene-polyisoprene-polystyrene block copolymer. Furthermore, it has been determined that when the essential block copolymer has the restricted configuration relative to polystyrene block content and block molecular weight outlined hereinabove, it is possible to extend these copolymers with polystyrene, extending oils and fillers to a level substantially higher than when the polystyrene block content and molecular weights fall outside of the recited ranges. This is especially valuable from an economic view point and also promotes the processability of the compositions in machinery normally employed for the preparation of textile upper shoes and the like.

The basic block copolymers contemplated have the structure polystyrene - polyisoprene - (polyisoprene - polystyrene)$_{1-5}$. It is preferred that the block polymers have essentially three polymer blocks (any adjacent polyisoprene blocks being counted as single block) but this may vary according to the particular process by which they may be prepared. For example, the block polymers may be made by a sequential process involving the use of a lithium based catalyst which will cause the formation of block polymers having narrow molecular weight spread for two of the individual blocks with an essentially linear structure. The third segment has a comparatively wide molecular weight distribution and may be missing all together on a substantial proportion of the molecules due to chain termination. However, block polymers of greater reproducibility and improved performance are made if certain coupling processes are utilized which usually also result in formation of non-linear block polymer configurations. Such non-linear polymers may be referred to as star shaped, radial or branched, etc. polymers. The block copolymers may be prepared, for example, by first polymerizing styrene in an inert hydrocarbon solvent and inert atmosphere utilizing a lithium alkyl initiator until the desired molecular weight of the first polymer block has been achieved. Thereafter isoprene is introduced into the system and polymerization continues with the formation of a second polymer block which is about one-half of the molecular weight desired for the finished polyisoprene block. At this point a coupling agent may be utilized such as dihalohydrocarbon, e.g., dibromoethane to cause dimerization of this intermediate block copolymer to form the desired three-block copolymer having the structure polystyrene-polyisoprene-polystyrene. It is possible to utilize polyfunctional coupling agents to achieve either dimerization or block polymers having a higher degree of coupling. For the latter purpose, diesters of monohydric alcohols with dicarboxylic acid are especially preferred, such as diethyl adipate. This unexpectedly causes the formation of a coupled product which is between 3 and 4 times the molecular weight of the intermediate block copolymer being coupled. Certain other polyfunctional coupling agents may be utilized as well to achieve complex combinations of coupled components such as dimers, trimers, or tetramers of the intermediate block copolymers.

It has been unexpectedly found in accordance with the present invention that such block copolymers show an unaccountably high adhesion to textiles (especially cellulosic) when their polystyrene block content is between 45–55% and the polystyrene blocks have average molecular weight between 30,000 and 50,000. Preferably, the polyisoprene block(s) has an average molecular weight between about 70,000 and 90,000. The reason for this improved adhesion to textiles has not been clearly elucidated. It may be due to the fact that such block copolymers exhibit the ability to flow under high shear conditions which are encountered in injection molding equipment, such as injection molding shoe machinery and the like. Due to this improved flow under high shear conditions, it may be tentatively postulated that the foxing (and preferably soling) composition flows more readily into the interstices of the textile and becomes more firmly locked or fixed thereon so that later physical stresses due to flexing, wear, temperature changes or exposure to ozone or moisture does not cause the separation of the foxing from the textile as readily as occurs with other block copolymers which are not as firmly adhered to the textile. This is of course nothing more than a theory of a possible mechanism by which improved foxing adhesion is achieved in the present invention. Consequently, the latter does not depend upon the theory.

Another aspect of the present invention has been the experience that the subject block copolymers having relatively high polystyrene block content not only exhibit improved tensile strength and other stress-strain properties as compared with block polymers having relatively lower polystyrene block content but also, due to the improved overall physical properties of the polymer, it is possible to extend them to a greater degree with relatively lower cost materials than has heretofore been possible and still achieve satisfactory properties for such end uses as textile shoe foxing and soling. This is extremely important in the highly competitive field of textile shoe production. There is no means by which such features could be predicted by a general knowledge of the field of block copolymers. A delicate balance exists between the relative proportions of the block copolymer structure, monomers from which the polymer is made, proportion of the individual polymer blocks and molecular weight of these blocks relative to their physical properties and the ability of the polymer to be extended as discussed above. Consequently, this is in effect an empirical art which in any one application can only be optimized by extensive trial and error.

Another of the unexpected features of the present invention as referred to hereinbefore is the finding that the block copolymers of polystyrene and isoprene defined hereinabove exhibit remarkably good resistance to alteration on exposure to ozone. This is especially unexpected in view of the sensitivity to ozone of other block copolymers containing other conjugated diene polymer blocks, such as those having the configuration polystyrene-polybutadiene-polystyrene. Moreover, it has been found that the block copolymer of the invention may be used to stabilize the viscosity of the second type especially when the composition comprises 100 parts by weight of the block copolymer having the structure polystyrene-polyisoprene-(polyisoprene-polystyrene)$_{1-5}$ together with 50–150 parts by weight of the polybutadiene counterparts thereof. Furthermore, not only is it possible to stabilize the viscosity of the latter with respect to the effects of the elevated temperatures of processing by the presence of the former but also it is possible to design such compositions so that the blends may be utilized to great advantage in the preparation of textile upper shoes. It has been found, however, that it is necessary to employ different molecular weight ranges for the polybutadiene type of block polymer than is necessary for the polyisoprene counterparts thereof. When blends are contemplated for use in foxing and soling compositions, it is therefore essential to employ polybutadiene counterparts wherein the polystyrene blocks have molecular weight ranges between about 20,000 and 30,000 and polybutadiene blocks wherein the average molecular weight ranges between 35,000 and 150,000. When the block molecular weights are below or above these ranges, it is then found that the resulting compositions either may be unsuitable for use in injection molding equipment or on the other hand may be incapable of being extended with oils, polystyrene and fillers to the extent desired and necessary for the provision of economically competitive compositions.

The block copolymers containing polybutadiene blocks may be prepared by the same general set of polymerization and coupling reactions described above when reference was made to the preparation of the polyisoprene block copolymers. The difference between the average molecular weight ranges of suitable polyisoprene block polymers and of suitable polybutadiene block polymers appears to be due to their difference in flow properties under high shear conditions such as are encountered in equipment utilized for the preparation of injection molded articles and specifically in injection molding shoe forming machinery. The block molecular weights are also necessitated in one respect by trade demands for soling and foxing compositions having a certain degree of hardness. Thus when extended as described more fully hereinafter, it is necessary that the block copolymers function to provide compositions falling within a desired hardness range.

The shoe assemblies especially contemplated are those having the following compositions.

| Components: | Parts by weight |
| --- | --- |
| Block copolymer | 100 |
| Polystyrene | 25–125 |
| Extending oil | 50–150 |
| Filler | 0–200 |

In accordance with one aspect of the present invention, it has been found that the particular class of polyisoprene type of block copolymers described hereinbefore is especially amenable to the formation of such compositions which in turn have been found to be especially suitable for the formation of foxing and soling for textile upper footwear. The reason for the high degree of adhesion experienced with foxing strips made from such compositions is the basis for the present invention although, of course, the compositions may be employed for other purposes. Preferably the same composition is utilized for both soling and foxing although compositions may be utilized for foxing alone, the soling being prepared from other compounds. The adherence of foxing strips to the textile uppers is an especially vexing problem during the wear of the life of the shoe and particularly when subject to the adverse influences of moisture introduced by wet weather, washing or perspiration. The area of separation is most commonly at that part of the shoe or other footwear where flexing occurs during use. The comparative data given in the working examples which follow will show the unexpectedly superior results obtained when the foxing compositions are comprised of the above described polyisoprene type of block copolymers.

The use of the particular polyisoprene type of block copolymer described hereinbefore enables the extension of the copolymer for use as foxing and the like with polymers such as polystyrene of which the crystal grade is preferred although high impact polystyrene may be utilized in addition to or in place thereof. The extending oils which may be employed are the well-known rubber extending oils usually of petroleum origin and preferably of relatively low aromatic content. The naphthenic oils are especially preferred. Fillers which may be utilized include particularly clays, calcium carbonates, titanium dioxide and the like.

The following working examples illustrate the several aspects of the present invention.

EXAMPLE I

Three compositions were prepared as outlined in Table I below to demonstrate the advantages of the compositions of the present invention insofar as they apply to the improved adhesion of foxing compositions to canvas shoe uppers. The block polymer of the composition referred to in the table as "SIS" was a block copolymer having the composition polystyrene - polyisoprene - polystyrene wherein the block molecular weights were 35,000–74,000–35,000. For comparison, a block copolymer of butadiene was employed having the structure polystyrene-polybutadiene-polystyrene, the block molecular weights being 23,000–41,000–23,000. The compositions were modified as indicated in the table with polystyrene, a naphthenic petroleum oil and fillers to produce the compositions desired for injection molding on the canvas uppers as both soling and foxing. Two tests were applied to the foxing one of which is referred to in Table I as "Foxing Peel" test, the conditions of the test being as follows:

A strip is cut from the shoe foxing area about 0.6 x 6 inches and accuratey trimmed to 0.5 x 5 inches. From one end of the strip a separation is normally begun between the fabric and the foxing composition across the width (0.5 inch) of the sample. The dry sample is tested for peel strength by separating the jaws of a testing machine in which the sample is clamped at a rate of 0.2 inch per minute. The peel strength is calculated as pounds pull per linear inch of sample width to maintain a steady, clean foxing-fabric separation rate. The same sample is soaked 30 minutes in one percent "Tide" and retested. The sample is dried and the whole procedure repeated.

The second test employed is referred to in Table I as "Foxing Separation" test.

A Ross Flex machine was set up to flex shoes laced onto artificial feet. These feet are of wood and rubber construction and allow a full 90° bend on the Ross Flex machine. Uppers were tightly laced to the artificial feet and the combination was bolted to a plate fastened vertically in a Ross Flex machine. The shoes were positioned in such a way that movement of the flex section of the machine caused a 90° flex of the shoe. To insure a reproducible flex, the toes were clamped to the flex section by means of a bar. If desired, water can be applied to the flex point of the shoes by means of twin burets.

It will be noted from the table that the foxing prepared from either the composition containing only the isoprene block copolymer or from the Sample C in which both block copolymers were present resulted in definitely superior foxing adhesion as compared with the composition containing only the polybutadiene block copolymer. The physical properties given at the bottom of Table I indicate that the two compositions containing the polyisoprene block copolymer were superior in a number of other respects relative to the polybutadiene block copolymer compositions.

TABLE I

|  | Sample A | Sample B | Sample C |
|---|---|---|---|
| Components (parts by weight): | | | |
| Block polymer: | | | |
| SIS [a] | 0 | 100 | 50 |
| SBS [b] | 100 | 0 | 50 |
| Polystyrene | 60 | 60 | 60 |
| Oil | 110 | 110 | 100 |
| Filler | 90 | 90 | 90 |
| Foxing peel, p.l.i.: | | | |
| Cycle 1: | | | |
| Dry | 15 | 13 | 16 |
| Wet | 9 | 6 | 8 |
| Cycle 2: | | | |
| Dry | 8 | 11 | 13 |
| Wet | 7 | 6 | 8 |
| Foxing separation, in.[2] (wet): | | | |
| 25,000 cycles | 1.28 | 0.03 | |
| 45,000 cycles | 2.20 | 0.03 | |
| 200,000 cycles | | 0.45 | |
| Hardness, Shore A | 38 | 49 | 49 |
| Modulus, 300%, p.s.i. | 450 | 580 | 660 |
| Tensile, p.s.i. | 500 | 650 | 680 |
| Angle tear, p.l.i. | 95 | 135 | 160 |

[a] Polystyrene-polyisoprene-polystyrene.
[b] Polystyrene-polybutadiene-polystyrene.

EXAMPLE II

Samples A and B as described in Table I were exposed to an atmosphere containing 40 parts per hundred million of ozone. Table II below indicates the adverse effect of this ozone exposure to the composition containing only the butadiene block copolymer as compared with Sample B which contained only the polyisoprene block copolymer.

TABLE II

| Time of exposure at 40 p.p.h.m. $O_3$ (hr.) | SBS Sample A | SIS Sample A |
|---|---|---|
| 0.5 | 9.5 | 10 |
| 1 | 8.5 | 10 |
| 15 | 4 | 9.5 |
| 79 | 0 | 9.0 |
| 109 | 0 | 9.0 |

Samples for the ozone test were cut from compression molded slabs. They were arranged according to ASTM 518–61, procedure B, and exposed according to ASTM 1149–62T. Samples are rated on a basis of 10 for no visible cracking and 0 for complete failure (cracked completely through). Samples are rated visually by comparison with standard samples or photographs.

We claim as our invention:
1. A composition comprising:
(a) 100 parts by weight of a block copolymer having the general configuration polystyrene-polyisoprene-(polyisoprene-polystyrene)$_{1-5}$ wherein the total polystyrene block content is 45–55% by weight of the block polymer, each polystyrene block having an average molecular weight between about 30,000 and about 50,000, and the polyisoprene block having an average molecular weight between about 70,000 and about 90,000; and
(b) 50–150 parts by weight, of a second block copolymer having the general configuration polystyrene-polybutadiene-(polybutadiene-polystyrene)$_{1-5}$ wherein the total polystyrene block content is 45–55% by weight of the block polymer, each polystyrene block having an average molecular weight between 20,000 and 30,000 and the polybutadiene block having an average molecular weight between 35,000 and 150,000.

2. A shoe assembly comprising a textile upper, a soling and a foxing strip covering the lower portion of the upper, said foxing strip comprising a composition comprising:

| Component: | Parts by weight |
|---|---|
| Block copolymer | 100 |
| Polystyrene | 25–150 |
| Extending oil | 50–150 |
| Filler | 0–200 | wherein the block copolymer has the composition of claim 1.

3. A shoe assembly comprising a textile upper, a soling and a foxing strip covering the lower portion of the upper, said foxing strip comprising:
(a) 100 parts by weight of a block copolymer having the general structure
polystyrene-polybutadiene-(polybutadiene-polystyrene)$_{1-5}$
wherein the total polystyrene block content is 45–55% by weight of the block polymer, each polystyrene block having an average molecular weight between about 30,000 and about 50,000, and the polyisoprene block having an average molecular weight between about 70,000 and about 90,000; and
(b) 50–150 parts by weight of a second block copolymer having the general configuration
polystyrene-polybutadiene-(polybutadiene-polystyrene)$_{1-5}$
wherein the total polystyrene block content is 45–55% by weight of the block polymer, each polystyrene block having an average molecular weight between about 20,000 and about 30,000, and the polybutadiene block having an average molecular weight between about 35,000 and about 150,000.

4. A shoe assembly comprising:
a canvas upper and as a soling and foxing, a composition comprising:
50 parts by weight of a block copolymer having the configuration
polystyrene-polyisoprene-polystyrene,
the polystyrene block molecular weights being about 35,000 and the polyisoprene block molecular weight being about 81,000;
50 parts by weight of a block copolymer having the general configuration
polystyrene-polybutadiene-polystyrene
the polystyrene block molecular weights being about 23,000 and the polybutadiene block molecular weight being about 41,000;
60 parts by weight of crystal polystyrene;
115 parts by weight of an extending hydrocarbon oil; and
90 parts by weight of particulate filler.

References Cited

UNITED STATES PATENTS 3,464,850   9/1969   Haefele _____ 260—880

SAMUEL H. BLECH, Primary Examiner

U.S. Cl. X.R.

260—33.6 AQ, 41.5 R, 41.5 A, 876 B, 880 B